US011610210B2

(12) United States Patent
Astvatsaturov et al.

(10) Patent No.: US 11,610,210 B2
(45) Date of Patent: Mar. 21, 2023

(54) SYSTEMS AND METHODS FOR DETECTING POTENTIAL SHRINK EVENTS VIA RFID TECHNOLOGY

(71) Applicant: ZEBRA TECHNOLOGIES CORPORATION, Lincolnshire, IL (US)

(72) Inventors: Yuri Astvatsaturov, Lake Forest, IL (US); Patrick Mauro, Lake Grove, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/917,488

(22) Filed: Jun. 30, 2020

(65) Prior Publication Data
US 2021/0406918 A1 Dec. 30, 2021

(51) Int. Cl.
*G06Q 30/00* (2012.01)
*G06Q 20/20* (2012.01)
*G06Q 30/02* (2012.01)
*G06Q 30/018* (2023.01)
*G06K 7/10* (2006.01)
*G06K 7/14* (2006.01)

(52) U.S. Cl.
CPC ..... *G06Q 30/0185* (2013.01); *G06K 7/10366* (2013.01); *G06K 7/1413* (2013.01); *G06Q 20/208* (2013.01); *G06Q 20/209* (2013.01); *G06Q 30/0281* (2013.01); *G06Q 20/203* (2013.01); *G06Q 20/204* (2013.01)

(58) Field of Classification Search
CPC ............. G06Q 30/0185; G06Q 20/208; G06Q 20/209; G06Q 30/0281
See application file for complete search history.

(56) References Cited

U.S. PATENT DOCUMENTS

| 6,025,780 | A | * | 2/2000 | Bowers | ................ | G07G 1/009 |
|---|---|---|---|---|---|---|
| | | | | | | 340/572.3 |
| 6,507,279 | B2 | * | 1/2003 | Loof | ..................... | G06Q 20/20 |
| | | | | | | 340/572.1 |
| 7,387,241 | B2 | * | 6/2008 | Hassenbuerger | ....... | A47F 9/046 |
| | | | | | | 235/383 |
| 8,002,173 | B2 | * | 8/2011 | Ackley | .................... | H04Q 9/00 |
| | | | | | | 235/375 |
| 8,214,651 | B2 | * | 7/2012 | Anemikos | ............... | G06F 21/35 |
| | | | | | | 713/185 |

(Continued)

*Primary Examiner* — Peter Ludwig
(74) *Attorney, Agent, or Firm* — Yuri Astvatsaturov

(57) ABSTRACT

Systems and methods for detecting potential shrink events via RFID technology are provided. The systems include a point of sale (POS) system that includes an optical scanner, an RFID transceiver arrangement, a user interface and a controller. The controller is configured to perform example methods disclosed herein. For example, the controller may detect that the optical scanner has decoded a barcode, trigger the RFID transceiver arrangement to write a data string to an RFID tag located within the object scanning area, conduct a detection operation to detect the RFID tag with the data string in the bagging area. Responsive to detecting the RFID tag with the data string, the method involves the user interface performing a first operation. Responsive to not detecting the RFID tag with the data string, the method involves the user interface performing a second operation.

14 Claims, 9 Drawing Sheets

(56) References Cited

U.S. PATENT DOCUMENTS

| | | | | |
|---|---|---|---|---|
| 9,105,024 | B2* | 8/2015 | Gentelet | G06K 17/00 |
| 10,140,829 | B1* | 11/2018 | Calvarese | G06K 7/10415 |
| 10,311,438 | B2* | 6/2019 | Lewis | G07G 1/0072 |
| 10,319,204 | B1* | 6/2019 | Wulff | G06Q 10/00 |
| 2004/0195336 | A1* | 10/2004 | Silverbrook | G06K 7/10623 |
| | | | | 235/462.43 |
| 2007/0040687 | A1* | 2/2007 | Reynolds | G06K 7/10356 |
| | | | | 340/572.7 |
| 2007/0081671 | A1* | 4/2007 | Ross | H04L 9/32 |
| | | | | 380/255 |
| 2012/0008819 | A1* | 1/2012 | Ding | G06V 40/20 |
| | | | | 382/100 |
| 2013/0144757 | A1* | 6/2013 | Bauer | H01Q 1/22 |
| | | | | 705/26.61 |
| 2015/0108210 | A1* | 4/2015 | Zhou | H04W 4/02 |
| | | | | 235/375 |
| 2017/0011606 | A1* | 1/2017 | Ceccon | G06Q 20/18 |
| 2017/0208970 | A1* | 7/2017 | Ryner | A47F 9/04 |
| 2018/0129830 | A1* | 5/2018 | Zumsteg | G06K 7/0004 |
| 2019/0019385 | A1* | 1/2019 | Caution | G08B 13/248 |
| 2021/0097517 | A1* | 4/2021 | Handshaw | G07G 1/0063 |
| 2021/0097826 | A1* | 4/2021 | Trivelpiece | G08B 13/246 |
| 2021/0264756 | A1* | 8/2021 | Sagar | H04W 4/80 |
| 2021/0327234 | A1* | 10/2021 | Chandramowle | G06Q 20/12 |

* cited by examiner

SYSTEMS AND METHODS FOR DETECTING POTENTIAL SHRINK EVENTS VIA RFID TECHNOLOGY

BACKGROUND

Shrink events occur when a retail venue loses product, typically due to theft. One source of shrink events occur at self-checkout point of sale (POS) kiosks. As one example, someone may swap the ticket (i.e., the price sticker that includes barcode that identifies the product) of an expensive object with one for a cheap object (referred to herein as "ticket switching"). As a particular example, the person may cover up the ticket on a mobile phone with a ticket from a candy bar.

As another example, someone may hold multiple objects while scanning only a single object. returning to the previous example, the person may place the mobile phone above the candy bar, such that the optical scanner of the self-checkout kiosk only detects the candy bar ticket (referred to herein as "piggybacking"). As yet another example, someone may scan one object, but place multiple objects into the bagging area afterwards (referred to herein as "foreign tag scenario") Thus, when the objects are subsequently placed in the bagging area, the self-checkout system believes that only a single object was placed therein.

While some self-checkout systems include weight sensors in the bagging area to help thwart this problem, a clever person may swap tickets for objects that have similar weights, but vastly different prices. Thus, the weight-based techniques are insufficient to detect many types of shrink events. While the above examples relate to self-checkout kiosks, it should be appreciated that ticket switching may still occur during cashier-operated POS processes.

In view of the above-described potential for shrink events to occur, it is beneficial to be able to detect objects that are placed in the bagging area of a POS system. The above-described limitations on conventional POS systems to detect objects in the bagging often lead to a frustrating experience for customers interacting with the POS system. Accordingly, there is a need for improved systems and methods that can detect potential shrink events.

SUMMARY

In an embodiment, the present invention is a point-of-sale (POS) system having an object scanning area and a bagging area. The POS system includes (i) an optical scanner configured to detect barcodes associated with objects; (ii) a radio frequency identification (RFID) transceiver arrangement configured to interrogate RFID tags, wherein the RFID transceiver arrangement is configured to have a signal range that extends (a) over at least a portion of the object scanning area, and (b) over at least a portion of the bagging area; (iii) a user interface apparatus; and (iv) a controller operatively connected to the optical scanner, the RFID transceiver arrangement, and the user interface apparatus. The controller is configured to (1) detect that the optical scanner has decoded a barcode associated with an object; (2) trigger the RFID transceiver arrangement to write a data string to an RFID tag associated with the object and located within the at least the portion of the object scanning area; (3) conduct a detection operation wherein the detection operation attempts to detect, via the RFID transceiver arrangement, the RFID tag with the data string in the at least the portion of the bagging area; (4) responsive to detecting the RFID tag with the data string in the at least the portion of the bagging area, causing the user interface apparatus to perform a first operation; and (5) responsive to not detecting the RFID tag with the data string in the at least the portion of the bagging area, causing the user interface apparatus to perform a second operation.

In another embodiment, the present invention is a POS system having an object scanning area and a bagging area. The POS system includes (i) an optical scanner configured to detect barcodes associated with objects; (ii) a RFID transceiver arrangement configured to interrogate RFID tags, wherein the RFID transceiver arrangement is configured to have a signal range that extends (a) over at least a portion of the object scanning area, and (b) over at least a portion of the bagging area; (iii) a user interface apparatus; and (iv) a controller operatively connected to the optical scanner, the RFID transceiver arrangement, and the user interface apparatus. The controller is configured to (1) detect that the optical scanner has decoded a barcode associated with an object; (2) trigger the RFID transceiver arrangement to sense at least one RFID tag located within the at least the portion of the object scanning area; (3) responsive to detecting a plurality of RFID tags in the at least the portion of the object scanning area, identify an object association of each of the plurality of RFID tags; (4) cause a comparison of each of the object association of each of the plurality of RFID tags to at least one of (i) the object and (ii) the barcode associated with the object, wherein for each of the plurality of RFID tags having a match between the object association and the at least one of (i) the object and (ii) the barcode associated with the object, controller is configured to write, via the RFID transceiver arrangement, a data string to the each of the plurality of RFID tags having the match; (5) conduct a detection operation wherein the detection operation attempts to detect, via the RFID transceiver arrangement, at least one RFID tag located within the at least the portion of the bagging area; (6) responsive to detecting a single RFID tag having the data string within the at least the portion of the bagging area, causing the user interface apparatus to perform a first operation; (7) responsive to not detecting at least one RFID tag having the data string within the at least the portion of the bagging area, causing the user interface apparatus to perform a second operation; and (8) responsive to detecting multiple RFID tags within the at least the portion of the bagging area, causing the user interface apparatus to perform a third operation.

In another embodiment, the present invention is a POS system having an object scanning area and a bagging area. The POS system includes (i) an optical scanner configured to detect barcodes associated with objects; (ii) a RFID transceiver arrangement configured to interrogate RFID tags, wherein the RFID transceiver arrangement is configured to have a signal range that extends (a) over at least a portion of the object scanning area, and (b) over at least a portion of the bagging area; (iii) a user interface apparatus; and (iv) a controller operatively connected to the optical scanner, the RFID transceiver arrangement, and the user interface apparatus. The controller is configured to (1) detect that the optical scanner has decoded a barcode associated with an object; (2) trigger the RFID transceiver arrangement to read an identifier RFID tag located in the at least the portion of the object scanning area; (3) determine whether a first identifier encoded by the barcode matches a second identifier read from the identifier RFID tag; (4) responsive to determining that the first identifier matches the second identifier, write a first data string to a flag RFID tag; (5) responsive to determining that the first identifier does not match the second identifier, performing at least one of (i)

writing a second data string to the flag RFID tag, and (ii) not writing a data string to the flag RFID tag; (6) conduct a read operation wherein the read operation attempts to read, via the RFID transceiver arrangement, the flag RFID tag in the at least the portion of the bagging area; (7) responsive to reading the first data string, causing the user interface apparatus to perform a first operation; and (8) responsive to reading at least one of (i) the second data string, and (ii) no data string, causing the user interface apparatus to perform a second operation.

In another embodiment, the present invention is a RFID detection system for use in a venue and having an object scanning area. The RFID detection system includes (i) an optical scanner configured to detect barcodes associated with objects; (ii) a first RFID transceiver arrangement configured to interrogate RFID tags, wherein the first RFID transceiver arrangement is configured to have a signal range that extends over at least a portion of the object scanning area; (iii) a second RFID transceiver arrangement configured to interrogate RFID tags, wherein the second RFID transceiver arrangement is configured to have a signal range that extends over at least a portion of the venue between the optical scanner and an exit area; and (4) a POS controller operatively connected to the optical scanner, and the first RFID transceiver arrangement. The POS controller is configured to (1) detect that the optical scanner has decoded a barcode associated with an object; (2) trigger the first RFID transceiver arrangement to interrogate an identifier RFID tag located in the at least the portion of the object scanning area; (3) detect a mismatch between a first identifier encoded by the barcode and a second identifier read from the identifier RFID tag; and (4) write, via the first RFID transceiver arrangement, a data string to a flag RFID tag. The RFID detection system also includes (v) a central controller operatively connected to the second RFID transceiver arrangement. The central controller is configured to (1) conduct a read operation wherein the read operation reads, via the second RFID transceiver arrangement, the flag RFID tag in the at least the portion of the venue between the optical scanner and the exit area; and (2) responsive to reading the data string, via the read operation, perform a shrink remediation operation.

In another embodiment, the present invention is a POS system having an object scanning area and a bagging area. The POS system includes (i) an optical scanner configured to detect barcodes associated with objects; (ii) a RFID transceiver arrangement configured to interrogate RFID tags, wherein the RFID transceiver arrangement is configured to have a signal range that extends (a) over at least a portion of the object scanning area, and (b) over at least a portion of the bagging area; (iii) a user interface apparatus; and (iv) a controller operatively connected to the optical scanner, the RFID transceiver arrangement, and the user interface apparatus. The controller is configured to (1) detect, via the RFID transceiver arrangement, an identifier RFID tag associated with an object within the at least the portion of the object scanning area; (2) subsequent to detecting the RFID tag in the at least the portion of the object scanning area, detect, via the RFID transceiver arrangement, at least one of (i) the identifier RFID tag and (ii) a flag RFID tag associated with the object within the at least the portion of the bagging area; (3) conduct a detection operation wherein the detection operation identifies whether a barcode decode event has occurred, wherein the barcode decode event including decoding, via the optical scanner, a barcode associated the object; (4) responsive to detecting that the barcode decode event has occurred, causing the user interface apparatus to perform a first operation; and (5) responsive to detecting that the barcode decode event has not occurred, causing the user interface apparatus to perform a second operation

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
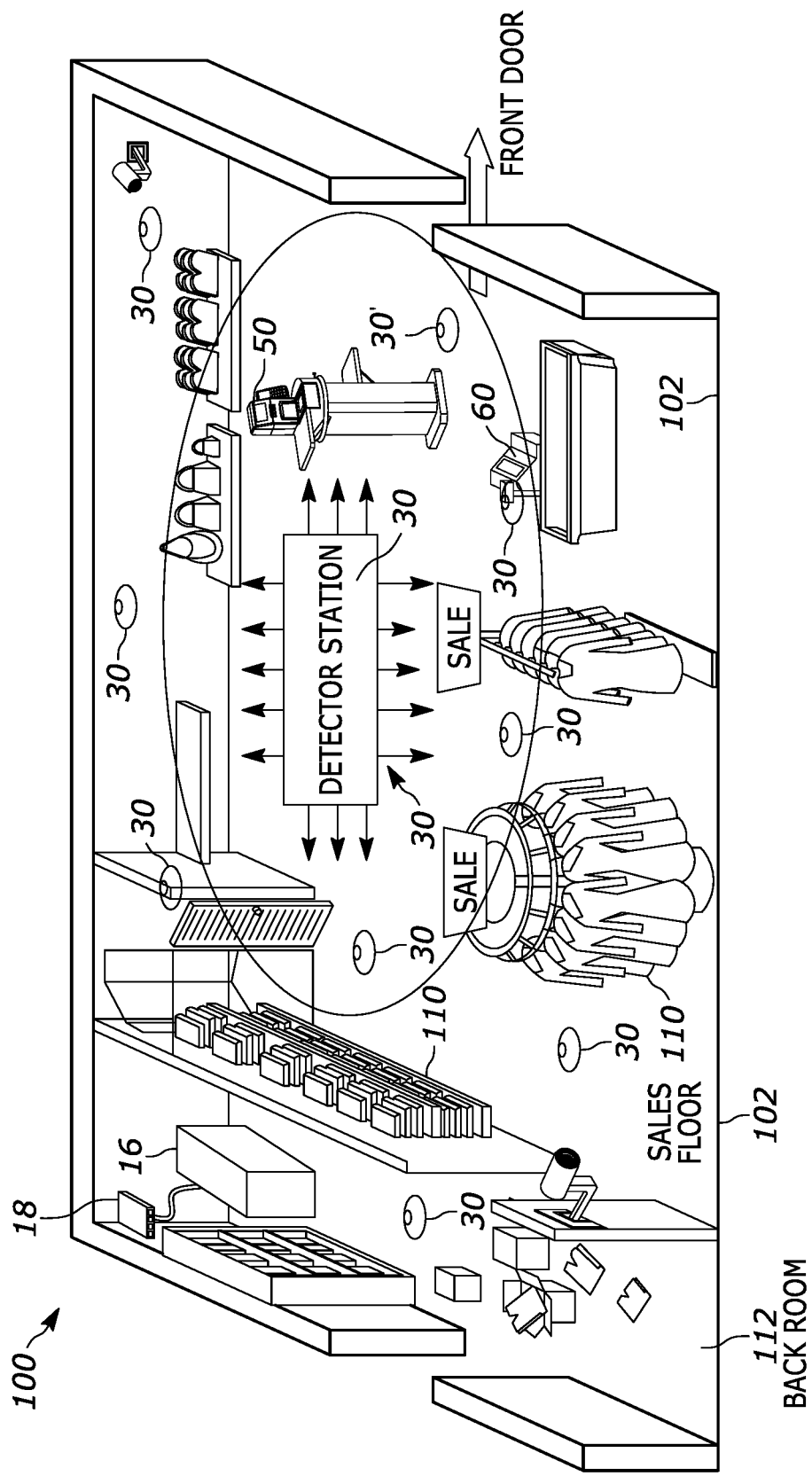
FIG. 1 illustrates an example venue that includes the RFID tracking system disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 is a perspective view, as seen from above, of a venue 100 illustrating an arrangement for which a Radio Frequency Identification (RFID) tracking system within the venue 100 is deployed to facilitate tracking objects 110 within the venue. Although the example venue 100 is a retail venue, other types of venues (such as an airport, a stadium, a performance center, a museum, and so on) are envisioned In the example embodiment of FIG. 1, the venue 100 includes a backroom 112 that has a central controller 16. In other embodiments, the central controller 16 may be located off-venue. The central controller 16 may be operated by store personnel and/or personnel associated with the RFID tracking system.

The central controller 16 may comprise a networked host computer or server. The central controller 16 may be connected to a plurality of detector stations 30 positioned throughout the venue 100 via the network switch 18. As further described herein, the detector stations 30 include RFID readers that are able to detect RFID tags (not depicted) that are affixed to objects 110 (such as clothing, books, toys, or any product or other object available for purchase at a venue). The detector stations 30 may include other sensors in addition to the RFID readers, for example, image sensors, ultrasonic sensors, etc.

The venue also includes a self-checkout POS system 50 and a cashier-operated POS system 60. As described in more detail below, the POS systems 50, 60 may include an RFID detector therein for detecting objects being purchased at the POS systems 50, 60. Additionally, the venue 100 may include one or more detector stations 30' positioned between the POS systems 50, 60 and an exit of the venue (the "front door").

Each of the detector stations 30 and the POS systems 50, 60 may either be in either wired or wireless electronic communication with central controller 16 via the network switch 18. For example, in some embodiments, the detector stations 30 and the POS systems 50, 60 may be connected via Category 5 or 6 cables and use the Ethernet standard for wired communications. In other embodiments, the detector stations 30 and the POS systems 50, 60 may be connected wirelessly, using built-in wireless transceiver, and may use the IEEE 802.11 (WiFi) and/or Bluetooth standards for wireless communications. Other embodiments may include detector stations 30 and POS systems 50, 60 that use a combination of wired and wireless communication. As the objects 110 are picked up by individuals, the detector stations 30 relay positioning information of the objects 110 (and/or the RFID tags affixed thereto) to the centralized controller 16. Accordingly, the central controller 16 is able to track the position of the objects 110 as they are carried throughout the venue 100, with detector stations 30' used to track the position of the objects 110 as they are carried toward the exit of the venue 100. In some embodiments, the detector station 30' is instead in the form factor similar to an electronic article surveillance (EAS) detector positioned near the exit of the venue.

Figure 2:
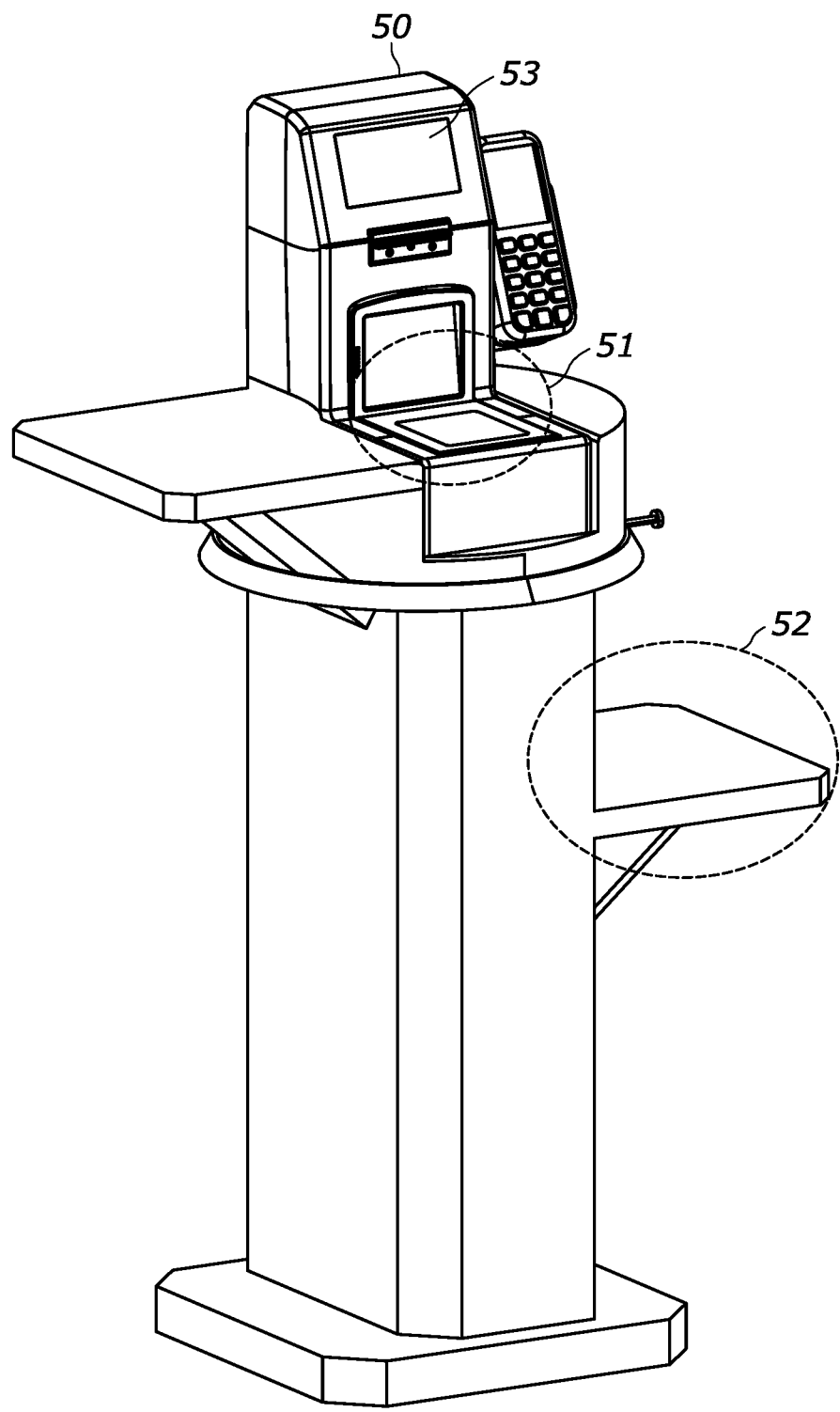
FIG. 2 illustrates an example POS system included in the RFID tracking system.

FIG. 2 illustrates an example POS system 50 included in the RFID tracking system of the venue 100. The POS system 50 includes an object scanning area 51 in which objects 110 are scanned by the POS system 50. The POS system also includes a bagging area 52 in which the objects 110 are placed after being scanned. The POS system 50 also includes a display unit 53 that serves as a user interface with the POS system 50 For example, the POS system 50 may display information about the object 110 and/or the checkout process via the display unit 53.

Figure 3:
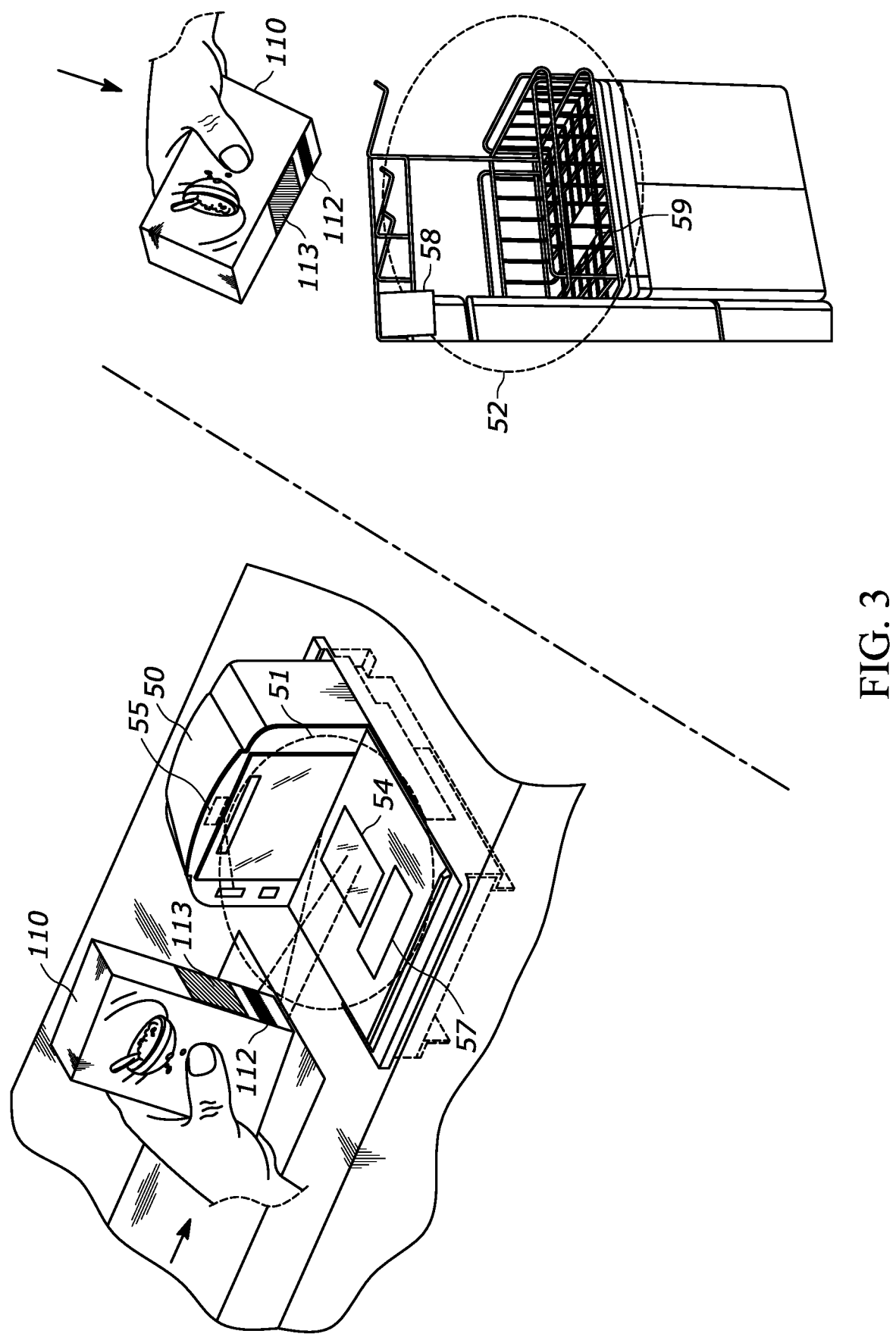
FIG. 3 illustrates the movement of an object from an object scanning area of the POS system to a bagging area of the POS system.

FIG. 3 illustrates the movement of an object 110 from the object scanning area 51 of the POS system 50 to the bagging area 52 of the POS system 50. As illustrated, the object 110 includes a barcode 112. The bar code 112 may be any type of barcode known in the art, including quick response (QR) codes and GS1 barcodes. The barcode 112 may encode a product identifier, such as a universal product code (UPC), corresponding to the object 110.

The object 110 also includes an RFID tag 113 affixed thereto. Like the barcode 112, the RFID tag 113 is configured to store a product identifier corresponding to the object 110. The product identifier encoded by the barcode 112 and the product identifier stored at the RFID tag 113 may be the same or different product identifiers that correspond to a particular type of object. In some embodiments, the object 110 may include multiple RFID tags 113 affixed thereto. For example, for some high-value objects 110 (e.g., mobile phones), an original equipment manufacturer (OEM) may affix a first RFID tag 113 to the object 110. As described below, techniques described herein involve writing data to the RFID tag 113. However, the RFID tag 113 affixed to the object by the OEM may be a read only RFID tag. Accordingly, a venue operator may affix a second RFID tag 113 to the object 110. Thus, when the techniques described herein write data to the RFID tag 113 corresponding to the object 110, the second, venue-affixed RFID tag 113 may execute the write operation. As it is generally used herein, the term "flag RFID tag" refers to an RFID tag 113 capable of executing a write operation.

As illustrated, the user moves the object 110 through the object scanning area 51. The POS system 50 includes one or more optical scanners 54 configured to detect and/or decode barcodes 112 affixed to objects 110. In some embodiments, the optical scanner 54 is a bioptic scanner that includes both image sensors having a generally vertical field of view passing through the object scanning area 51 and image sensors having a generally horizontal field of view passing through the object scanning area 51. In other embodiments, the optical scanner 54 includes only images sensors with generally vertical fields of view or image sensors with only generally horizontal fields of view.

Similarly, the POS system 50 includes one or more RFID transceiver arrangements 55, 57 configured to interrogate RFID tags 113 within the object scanning area 51. To this end, the transceiver arrangement 55 includes RFID antennas configured to emit a radiation pattern directed in a generally horizontal direction through the object scanning area 51 and the transceiver arrangement 57 includes RFID antennas configured to emit a radiation pattern directed in a generally vertical direction through the object scanning area 51. In some embodiments, the transceiver arrangements 55, 57 may be a phased antenna array. In these embodiments, the transceiver arrangements 55, 57 are able to track the movement of the RFID tag 113 (and, thus, the object 110) through the object scanning area 51 and towards the bagging area 52. It should be appreciate that in other embodiments, fewer, additional, and/or differently-oriented transceiver arrangements may be configured to sense RFID tags 113 in the object scanning area 51.

In some embodiments (not depicted), the POS system 50 includes a handheld scanner configured to scan barcodes 112 on object 110 too unwieldy to move past image sensors built into the housing of the POS system 50 (e.g., the illustrated optical scanner 54). Accordingly, in these embodiments, the optical scanner 54 may include the image sensor(s) included in the handheld scanner. Additionally, to support the RFID tracking techniques described herein, the handheld scanner may also be configured to include an RFID transceiver arrangement configured to interrogate RFID tags 113 located proximate to the handheld scanner. Thus, in these alternate scenarios in which the handheld scanner of the POS system 50 is used to scan the barcode 112, the object scanning area 51 may instead encompass a shopping cart or other carrier associated with the customer.

After the POS system 50 decodes the barcode 112, the POS system 50 is configured to utilize the RFID transceiver arrangements 55, 57 to perform potential shrink even detection. In some embodiments, the POS system 50 triggers the RFID transceiver arrangements 55, 57 to perform a read operation to sense any RFID tags (such as the RFID tag 113 affixed to the object 110) within the object scanning area 51. As part of the read operation, the POS system 50 obtains, from the RFID tags 113 within the object scanning area 51 the product identifier stored in the respective memories of the RFID tags 113.

In some embodiments, the POS system 50 may then compare the product identifiers obtained from the RFID tag 113 to the product identifier encoded by the barcode 112. If the product identifiers match, the POS system 50 may then write, via the transceiver arrangements 55, 57, a data string to the memory of the RFID tag 113 indicative of a successful scanning operation. In some other embodiments, the POS system 50 queries an object database (not depicted) to determine an object type corresponding to the obtained product identifier. If the obtained object type matches the object type corresponding to the product identifier encoded by the barcode 112, then the POS system may write, via the transceiver arrangements 55, 57, the data string to the memory of the RFID tag 113 indicative of a successful scanning operation. It should be appreciated that the term "data string" does not necessarily refer to the object type of "String" used in some programming languages. To this end, the data string may be a numeric value, a Boolean value, and/or data type capable of indicating a state. After conducting the write operation, the POS system 50 may add an indication of the object 110 to a transaction log corresponding to a current purchase event and cause the display unit 53 to display an indication of a successful scan. In some embodiments, the POS system 50 includes a slight delay timer (e.g., 500 msec, 1 sec) before displaying the indication to reduce the likelihood that the customer removes the object 110 from the object scanning area 51 before the write operation completes successfully. In other embodiments, the POS system 50 waits until receiving a write acknowledgement message from the target RFID tags 113 before displaying the indication of a successful scan.

If the POS system 50 detects a mismatch between the product identifiers obtained from the RFID tag 113 and the barcode 112, this may be indicative of a ticket switching scenario. Similarly, if the POS system detects a matching RFID tag 113 and an additional, non-matching RFID tag 113, this may be indicative of a piggybacking scenario. Accordingly, the POS system 50 may be configured to perform an action to confirm proper scanning of the object 110. For example, the POS system 50 may display, via the display unit 53, a message requesting that the customer rescans the object 110. As another example, the POS system 50 may alert an employee to assist in the checkout process. As yet another example, the POS system may write an alert data string to the memory of the non-matching RFID tag 113. In this example, if the non-matching RFID tag 113 is subsequently read by the transceiver arrangements 55, 57 in response to scanning a subsequent object 110 having a matching barcode 112, the alert data string may be overwritten with the successful scan data string.

It should be appreciated that in embodiments where multiple matching RFID tags 113 are sensed in the object scanning area 51, the POS system 50 may query the object database to determine whether the object is generally associated with identifier or OEM RFID tags and adjust the determination to account for the presence of both the identifier RFID tag 113 and the flag RFID tag 113 being affixed to the object 110.

In some embodiments, the transceiver arrangements 55, 57 operate in a write-only mode. That is, in response decoding the barcode 112, the POS system 50 is configured to perform the write operation to all RFID tags 113 within the object scanning area 51 without first performing a read operation to determine a match between the product identifiers encoded by the barcode 112 and the stored at the memory of the RFID tags 113. In these embodiments, the POS system 50 may be configured to determine the likelihood of a shrink event when a customer places the object 110 in the bagging area 52.

Turning to the bagging area 52, the POS system 50 includes one or more transceiver arrangements 58, 59 configured to interrogate RFID tags 113 within the bagging area 51. To this end, the transceiver arrangement 58 includes RFID antennas having radiation patterns oriented downwards towards a base of the bagging area 52. To this end, some packaging materials, such as some temperature controlled bags, are made of materials that interfere with the RF signals used in RFID technology. Accordingly, the transceiver arrangement 58 is configured to have a radiation pattern oriented towards the opening of bags in the bagging area 52. The transceiver arrangement 59 is built into a base housing of the bagging area 52 and has a radiation pattern generally vertical therefrom to sense RFID tags 113 placed above the transceiver arrangement 59. It should be appreciate that in other embodiments, fewer, additional, and/or differently-oriented transceiver arrangements may be configured to sense RFID tags 113 in the bagging area 52. For example, a shopping cart may include a transceiver arrangement configured to sense RFID tags 113 affixed to objects 110 placed therein.

The POS system 50 may be configured to conduct a read operation to sense RFID tags in the bagging area 52. As one example, the POS system 50 utilizes a change in a weight sensor in the bagging area as a trigger to perform the read operation. As another example, in embodiments where the transceiver arrangements 55, 57 include a phased antenna array, the POS system 50 utilizes the phased antenna array sensing a motion of the RFID tag 113 towards the bagging area as a trigger to conduct the read operation. As yet another example, after successfully scanning the object 110, the POS system 50 may enter a hold mode that prevents a subsequent scan of objects 110 via the optical scanner 54. When the POS system 50 is in this hold mode, the POS system 50 may periodically conduct the read operation (e.g., every second, every 3 seconds, every 5 seconds, and so on).

During the read operation corresponding to the bagging area 52, the POS system 50 attempts to identify new RFID tags 113 within the bagging area. That is, even though the transceiver arrangements 58, 59 may sense the RFID tags 113 affixed to objects 110 previously in the bagging area 52, the POS system 50 may take no further action until a new RFID tag 113 is sensed by the transceiver arrangements 58, 59.

After sensing the new RFID tag 113 in the bagging area 52, the POS system 50 configures the transceiver arrangements 58, 59 to interrogate the memory that stores the data flag written to it via the transceiver arrangements 55, 57 in the object scanning area 51. If the POS system 50 obtains the data string indicative of the successful scan, the POS system 50 may perform operations corresponding to a successful bagging event. For example, the POS system 50 may exit the hold mode to enable further scanning of objects 110 or a completion of a transaction.

On the other hand, if the POS system 50 obtains an alert data string or no data string (e.g., a default or null data string) from the RFID tag 113, it may be indicative of a piggybacking or a foreign object scenario. Accordingly, the POS system 50 may perform an action to remedy the situation. For example, the POS system 50 may display, via the display unit 53, a request to remove the foreign object 110 and/or scan the foreign object 110. As another example, the POS system 50 may alert venue personnel to assist with the checkout process. It should be appreciated that in embodiments where the object includes an identifier RFID tag 113, the identifier RFID tag 113 may be incompatible with the read operation. Accordingly, the read operation may obtain an error code or a nonsense string. Thus, the POS system 50 may take no remedial action in response to the read operation returning the error code and/or the nonsense string.

It should be appreciated that in other embodiments, the bagging area 52 may not include any transceiver arrangements configured to detect objects in the bagging area. In these embodiments, the RFID tracking system may instead rely on the RFID transceiver arrangement included in the detector station 30'. To this end, the detector station 30' may be configured to interrogate RFID tags 113 located in the venue between the POS system 50 and the exit of the venue 100. In some embodiments, the detector station 30' analyzes the interrogation response. In other embodiments, the detector station 30' relays the response to the central controller 16 for analysis. Regardless, the detector station 30' or the central controller 16 analyzes the response to determine if the data string is the same as the one written to the memory of the RFID tag 113 via the transceiver arrangements 55, 57. If so, the detector station 30' or the central controller 16 may take no further action. On the other hand, if the detector station 30' or the central controller 16 detects no data string or the alert data string, then the central controller 16 may perform a shrink remediation action. For example, the central controller 16 may generate an alert, close a door to the venue and/or notify venue personnel.

Figure 4:
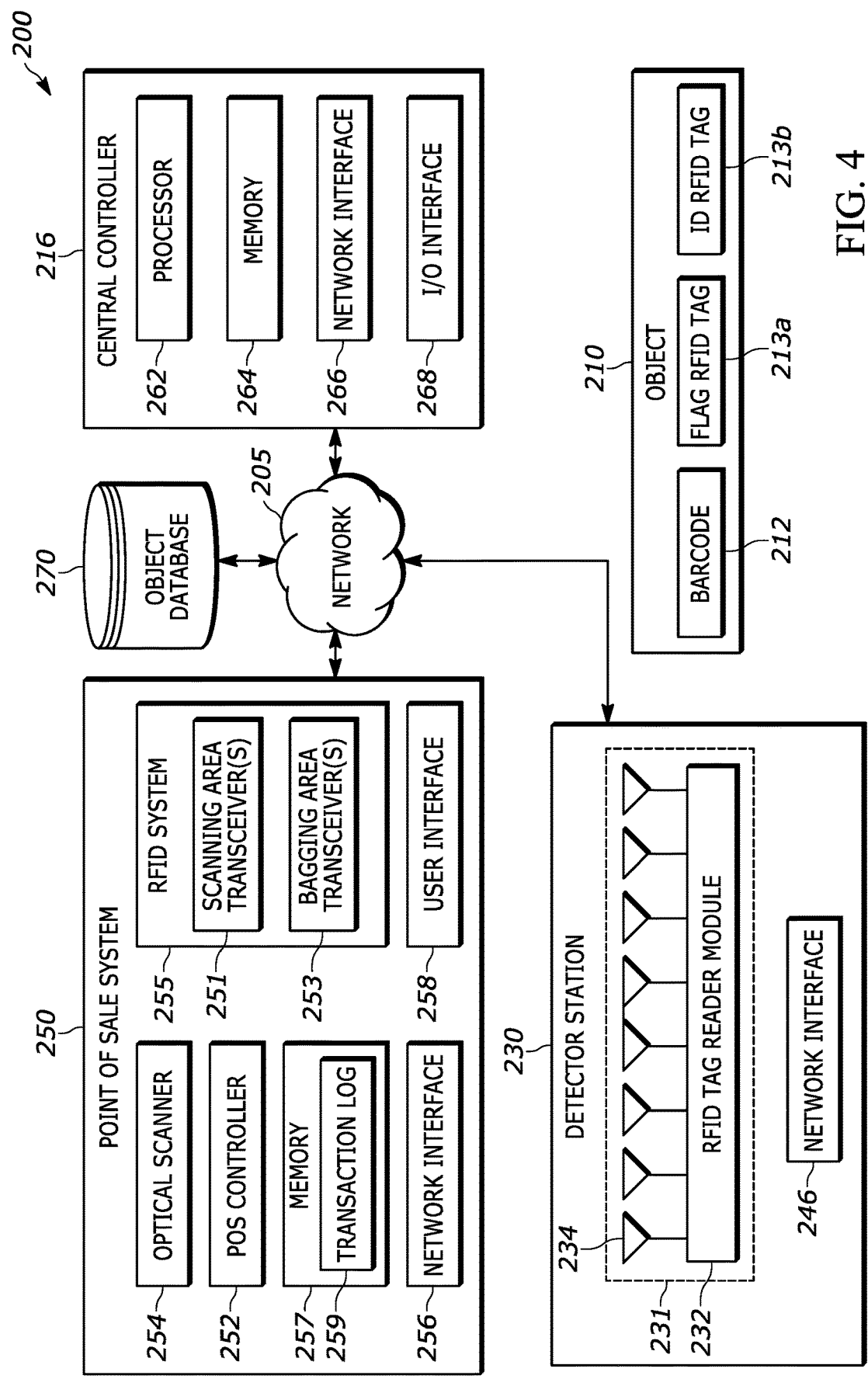
FIG. 4 is a block diagram representative of an RFID tracking system and the various components thereof.

It should be appreciated that while the description of FIGS. 2 and 3 generally refer to the self-checkout POS system 50, in some embodiments, the techniques are implemented at the controller of the cashier-operated POS system 60. In these embodiments, the transceiver arrangements 58, 59 oriented towards the bagging area 52 may account for the different arrangement FIG. 4 is a block diagram representative of an RFID tracking system 200 and the various components thereof capable of implementing the techniques described herein. The RFID tracking system 200 includes a POS system 250 (such as the POS systems 50, 60) that functions as a processing platform capable of executing instructions to, for example, implement operations of the example methods described herein (including those described with respect to the POS systems 50, 60), as may be represented by the flowcharts of the drawings that accompany this description. Example processing platforms include, for example, implementing operations of the example methods described herein via field programmable gate arrays (FPGAs) and application specific integrated circuits (ASICs).

The POS system 250 includes a POS controller 252 that includes a processor such as, for example, one or more microprocessors, controllers, and/or any suitable type of processor. The POS system 250 includes memory (e.g., volatile memory, non-volatile memory) 257 accessible by the processor 252 (e.g., via a memory controller). The example POS controller 252 interacts with the memory 257 to obtain, for example, machine-readable instructions stored in the memory 257 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the POS system 250 to provide access to the machine-readable instructions stored thereon. The example memory 257 includes a portion thereof dedicated to storing a transaction log for a purchase event facilitated by the POS system 250.

The POS system 250 also includes a network interface 256 to enable communication with other machines (e.g., the central controller 216) via, for example, one or more networks 205. The example network interface 256 includes any suitable type of communication interface(s) (e.g., wired and/or wireless interfaces) configured to operate in accordance with any suitable protocol(s).

The POS system 250 also includes user interfaces 258 to enable receipt of user input and communication of output data to the user. For example, the user interfaces 258 may include the touch screen display unit 53, an audio output unit, one or more LEDs, a payment processing unit (e.g., a credit card processing system and/or an automated money acceptance unit), and so on.

The POS system 250 also includes an optical scanner 254 configured to scan the barcode 212 corresponding to the object 210. The optical scanner 254 may include one or more image sensor, image processors, light emitting diodes, and other imaging components configured to sense the barcode 212 and decode a product identifier encoded by the barcode 212. The optical scanner 254 may include at least one a bioptic scanner built into a housing of the POS system 250 and a handheld scanning unit.

The POS system 250 also includes an RFID system 255 configured to sense RFID tags 213 affixed to objects 210 and to read and/or write data strings to a memory of the RFID tags 213. The RFID system 255 includes a first set of RFID transceivers 251 to have a signal range that extends over at least a portion of the object scanning area 51 (e.g., the RFID transceiver arrangements 55, 57) and a first set of RFID transceivers 251 to have a signal range that extends over at least a portion of the bagging area 52 (e.g., the RFID transceiver arrangements 58, 59). Accordingly, the scanning area transceivers 251 may be disposed in at least one of (i) a substantially horizontal position, and (ii) a substantially vertical position within a housing that includes the optical scanner and the bagging area transceivers 253 may be disposed in at least one of (i) a substantially horizontal position within a base unit of the bagging area, and (ii) a substantially vertical position within a structure extending above the base unit of the bagging area. In some embodiments, the scanning area transceivers 251 include a phased antenna array adapted to sense the motion of RFID tags 213 in the object scanning area 51, for example, by detecting a change in signal strength associated with messages received from the RFID tags 213.

To execute a read or write operation, the RFID may generate and transmit, via the transceivers 251, 253, an instruction formatted in accordance with an RFID protocol, such as ISO 18000. Responsive to transmitting a read instruction (also referred to as interrogating the RFID tag), the RFID transceivers 251, 253 receive a message from the RFID tags 213 that includes an indication of the requested parameter (e.g., a product identifier, or a scan status data string). Responsive to transmitting a write instruction, the RFID transceivers 251, 253 receive a message identifying whether or not the RFID tags 213 performed the write operation successfully. In some embodiments, one or both of the object scanning transceivers 251 and the bagging area transceivers 253 operate as just an RFID reader or just an RFID writer, and do not include the components for performing the other operation.

As illustrated, the POS system 250 interfaces with an object database 270 configured to store current information associated with one or more objects 210. For a particular object 210, the object database 260 may store indications of product identifiers, an object price, an object weight, an indication if the OEM affixes identification RFID tags 213b to the object 210, an indication of a shopping cart RFID system corresponding to the object 210 (e.g., an identifier of which shopping cart the object 210 was placed), and/or other information associated with the object 210. In some embodiments, at least a portion of the object database 270 is stored at the memory 257 of the POS system 250 and/or the memory 264 of the central controller 216. Additionally or alternatively, at least a portion of the object database 270 is maintained at an external memory (e.g., a cloud memory storage unit).

The RFID tracking system 200 also includes a central controller 216 (such as the central controller 16) configured to function as a processing platform capable of executing instructions to, for example, implement operations of the example methods described herein (including those described with respect to the central controller 16), as may be represented by the flowcharts of the drawings that accompany this description. Similar to the POS system 250, example processing platforms include, for example, implementing operations of the example methods described herein via field programmable gate arrays (FPGAs), application specific integrated circuits (ASICs), and/or cloud computing systems.

The central controller 216 includes a processor 262 such as, for example, one or more microprocessors, controllers, and/or any suitable type of processor. The central controller 216 includes memory (e.g., volatile memory, non-volatile memory) 264 accessible by the processor 262 (e.g., via a memory controller). The example processor 262 interacts with the memory 264 to obtain, for example, machine-readable instructions stored in the memory 264 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the central controller 216 to provide access to the machine-readable instructions stored thereon.

The central controller 216 also includes a network interface 266 to enable communication with other machines (e.g., the POS controllers 250 and/or the detector stations 230) via, for example, the one or more networks 205. The example network interface 266 includes any suitable type of communication interface(s) (e.g., wired and/or wireless interfaces) configured to operate in accordance with any suitable protocol(s).

For example, In some embodiments, the central controller 216 obtains RFID tag data from RFID tags 213 disposed within the venue 100. More particularly, the central controller 216 obtains the RFID tag data from the RFID tags 213 from serving detector stations 230 via the network interface 266. The central controller 216 then updates the object database 270 based on the obtained RFID tag data. For example, the central controller 216 may update the object database with the position of the RFID tags 213.

The central controller 216 also includes input/output (I/O) interfaces 268 to enable receipt of user input and communication of output data to the user of the central controller 216.

The RFID tracking system 200 also includes one or more detector stations 230 that include an RFID reader 231. In the illustrated example, the detector station 230 includes two example detectors 231 and 237, as further described herein. For example, a detector in the form of the RFID tag reader 231 is operative for reading the RFID tags 213 affixed to objects 210.

More particularly, as shown in FIG. 4, each RFID reader 231 includes an RFID tag reader module 232 that has a controller, a memory, and an RF transceiver, which are operatively connected to a plurality of RFID antenna elements 234, which are energized by the RFID module 232 to radiate RF energy (also referred to herein as a beam) over an antenna beam pattern. As those of skill will recognize, an antenna and its beam pattern can be characterized by the antenna's beam width (i.e., the antenna's half power beam width). The RF reader 231 is operated, under the control of the tag reader module 232, to transmit RF beam or wave energy to the RFID tags 210, and to receive RF response signals from the RFID tags 210, thereby interrogating and processing the payloads of the RFID tags 210 that are in a reading zone of the RF transceiver. The RFID reading zone for a detector station 230 may be a 360° zone defined by the RFID antenna elements 234 and their collective beam patterns. In various embodiments, a detector 230 may include eight RFID antenna elements 234, each maintained in a fixed position and each having a beam pattern extending in a different direction. During operation, the RF transceiver may capture RFID tag information that identifies RFID tags 213 affixed to the objects 210. The central controller 216 may be configured to control the overhead RFID readers 231 in the plurality of detector stations 230 to read the RFID tags 213 affixed to the objects 210.

The RFID transceivers 234 determine a signal strength for the data received from the RFID tags 213. The comparative signal strengths at the each RFID transceiver 234 of a particular detector 230 are used to determine the location (i.e., position) and/or direction of travel of the RFID tag, using a suitable locationing/positioning technique, such as triangulation, trilateration, multilateration, etc. Such locationing and direction of travel may be determined by analyzing data from multiple detector stations 230 and centralized controller 216. The example centralized controller 216 stores the determined location of the RFID tags in the object database 270 in a record corresponding to the object 210 on which the RFID tag 213 is affixed.

It should be appreciated that the scanning area transceivers 251 and the bagging area transceiver 253 of the POS system 250 may be configured similarly to the RF reader 231. However, as described herein, the scanning area transceivers 251 may also function as an RFID writer configured to write data to a memory of the RFID tags 213 affixed to the objects 210.

Any of the detector stations 230, including alone, together, or some combination thereof, may transmit electronic information, including any RFID tag data, or other information, to the central controller 216 for processing via the network 205. For example, the central controller 216 includes the network interface 266 communicatively coupled to network communication interfaces 246 of the detector stations 230 to receive sensed detector data, such as RFID tag data. The detector stations 230 may also receive information, commands, or execution instructions, including requests to provide additional sensory or detection information from the central controller 216 in order to perform the features and functionally as described herein.

Figure 5:
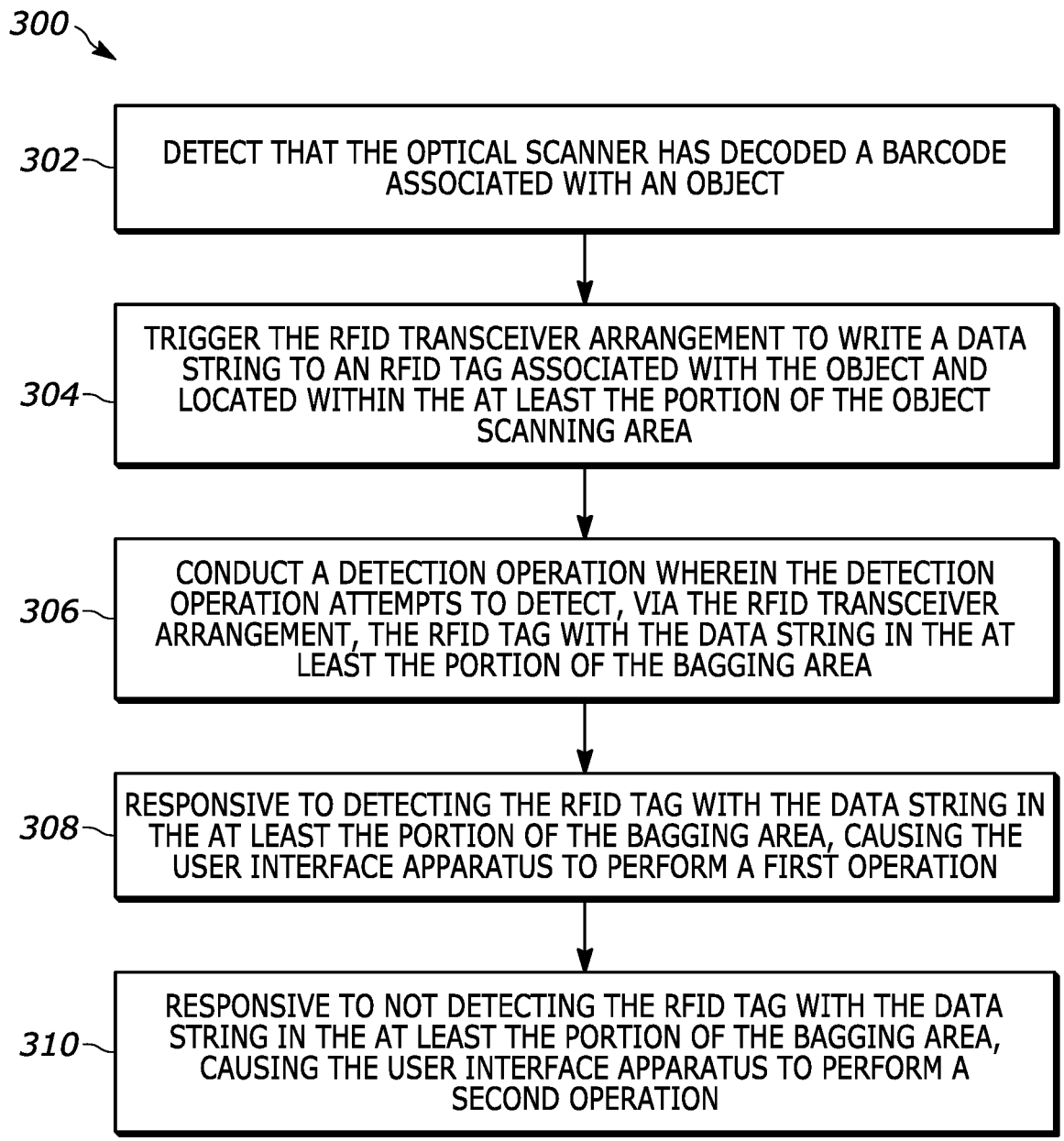
FIGS. 5-9 illustrate example flow diagrams that implement the point of sale RFID tracking techniques described herein.

FIG. 5 illustrates an example flow diagram 300 that implements the point of sale RFID tracking techniques described herein. In an embodiment, the flow diagram 300 is implemented by the POS system 250 of FIG. 4. As described above, in an embodiment, the POS system 250 includes an optical scanner 254, a RFID system 255 that includes transceiver arrangements 251, 253 configured to have a signal range that extends (i) over at least a portion of the object scanning area, and (ii) over at least a portion of the bagging area, respectively, a user interface 258, and a POS controller 252. For the example flow diagram 300, the RFID transceiver arrangement 251 portion of the RFID system 255 may operate as an RFID writer without the inclusion of RFID reader components and/or configuration.

The method 300 begins at block 302 when the POS controller 252 detects that the optical scanner 254 has decoded a barcode 212 associated with an object 210. In some embodiments, the POS system 250 includes a handheld scanner. In these embodiments, the optical scanner 254 and the RFID transceivers 251 are disposed within a housing of the handheld scanner.

At block 304, the POS controller 252 triggers the RFID system 255 to write a data string to an RFID tag 213 associated with the object 210 and located within the at least the portion of the object scanning area 51. More particularly, the POS controller 252 may trigger the RFID system 255 to write the data string via the RFID transceivers 251. As described herein, the data string may indicate that at least one of (a) the object 210 has been added to a transaction log 259, and (b) the barcode 212 associated with the object 210 has been decoded. In some embodiments, the POS controller 252 may generate a user-interpretable successful-decode signal subsequent to receiving verification that the data string has been written to the RFID tag 213. To this end, the POS controller 252 may detect, via the RFID system 255, the reception of a write confirmation message from the RFID tag 213 and cause the user interface 258 to display an indication of the successful write (e.g., by illuminating an LED or displaying a successful scan notification).

At block 306, the POS controller 252 conducts a detection operation wherein the detection operation attempts to detect, via the RFID system 255, the RFID tag 213 with the data string in the at least the portion of the bagging area 52. More particularly, the POS controller 252 may conduct the detection operation using the RFID transceivers 253 of the RFID system 255. As part of the detection operation, the POS controller 252 may be configured to read, via the RFID system 255, from a memory of the RFID tag 213 associated with the object; and determine that (i) the memory of RFID tag 213 stores the data string indicative of at least one of (a) the object 210 has been added to a transaction log 259, and (b) the barcode 212 associated with the object 210 has been decoded.

It should be appreciated that the term "attempt" is used because in some scenarios, the RFID tag 213 with the data string may not be detected by the RFID system 255. For example, in other scenarios, the POS controller may read, via the RFID system 255, from a memory of a secondary RFID tag 213 (e.g., an RFID tag 213 that was not written to at block 304, such as what may occur during a foreign object scenario) located within the at least the portion of the bagging area 52 and determine that the memory does not store the data string. In this scenario, the POS controller 252 may cause the user interface 258 to provide a notification indicating at least one of (i) a request that a foreign object be removed from the bagging area, and (ii) a request that the foreign object be scanned by the optical scanner.

At block 308, responsive to detecting the RFID tag 213 with the data string in the at least the portion of the bagging area 52, the POS controller 252 causes the user interface apparatus 258 to perform a first operation. For example, the first operation may be a release of a hold (and/or the corresponding visual indications thereof) that prevents at least one of (i) a subsequent decode of a subsequent barcode associated with a subsequent object, (ii) an addition of the subsequent object to a transaction log, and (iii) finalizing the transaction. In some embodiments, the POS controller 252 conducts the detection operation for a predetermined amount of time (e.g., 3 second, 5 seconds, 10 seconds, 20 seconds, and so on) before causing the user interface apparatus 258 to perform the second operation.

At block 310, responsive to not detecting the RFID tag 213 with the data string in the at least the portion of the bagging area 52, the POS controller 252 causes the user interface 258 to perform a second operation. For example, the second operation may be a notification indicating that the object 210 has not been detected in the at least the portion of the bagging area 52. It should be appreciated that the POS controller 252 generally performs only one of the first and second operations in response to a particular detection operation.

Figure 6:
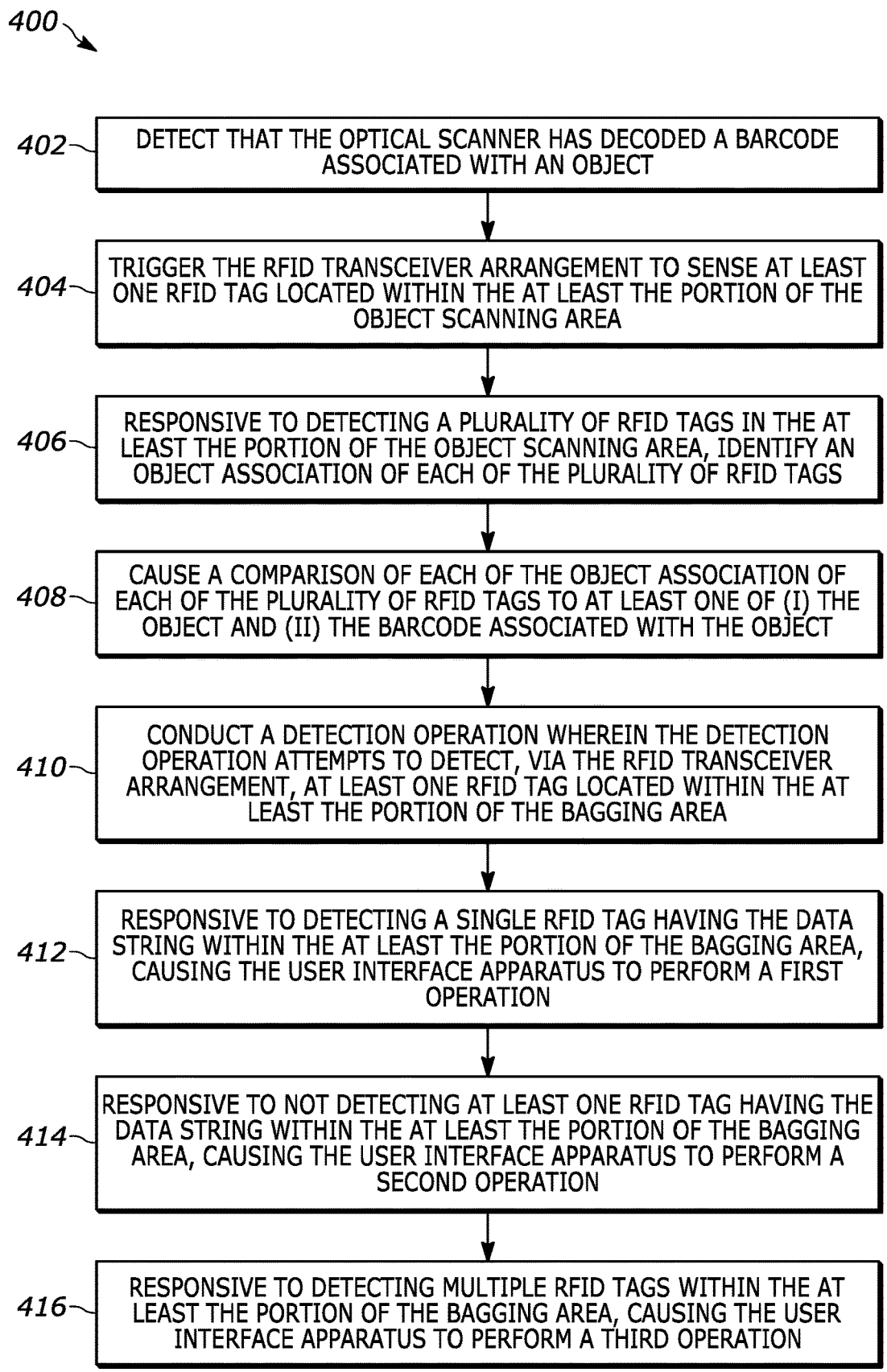

FIG. 6 illustrates an example flow diagram 400 that implements the point of sale RFID tracking techniques described herein. In an embodiment, the flow diagram 400 is implemented by the POS system 250 of FIG. 4. As described above, in an embodiment, the POS system 250 includes an optical scanner 254, a RFID system 255 that includes transceiver arrangements 251, 253 configured to have a signal range that extends (i) over at least a portion of the object scanning area, and (ii) over at least a portion of the bagging area, respectively, a user interface 258, and a POS controller 252. For the example flow diagram 400, the POS controller 252 may determine a correspondence between the barcode 212 and the RFID tag 213 before conducting a write operation to, among other functions, identify potential piggybacking and/or ticket switching scenarios.

The method 400 begins at block 402 when the POS controller 252 detects that the optical scanner 254 has decoded a barcode 212 associated with an object 210. In response to decoding the barcode 212, the POS controller 252 may add an indication of the object 210 to the transaction log 259. At block 404, the POS controller 252 triggers the RFID system 255 to sense at least one RFID tag 213 located within the at least the portion of the object scanning area 51. Blocks 402-404 may involve similar actions described with respect to blocks 302-304 of the flow diagram 300. Triggering the RFID system 255 to sense (e.g., interrogate) the RFID tags 213 causes the RFID tags 213 to transmit a corresponding response.

At block 406, responsive to detecting a plurality of RFID tags 213 in the at least the portion of the object scanning area 51, the POS controller 252 identifies an object association of each of the plurality of RFID tags 213. To this end, the responses received by the POS controller 252 from the plurality of RFID tags 213 may indicate a product identifier stored in their respective memories. In some embodiments, the POS controller 252 queries a local or remote object database, such as the object database 270, using the obtained product identifier to determine the object association.

At block 408, the POS controller 252 causes a comparison of each of the object association of each of the plurality of RFID tags 213 to at least one of (i) the object 210 and (ii) the barcode 212 associated with the object 210. Said another way, the POS controller 252 may determine (1) whether the product identifier decoded by the optical scanner 254 matches the product identifier obtained from the RFID tag 213 or (2) whether the product identifier decoded by the optical scanner 254 is an indication of the same type of object as the determined object associations of the RFID tags 213.

For each of the plurality of RFID tags having a match between the object association and the at least one of (i) the object and (ii) the barcode associated with the object, the POS controller 252 is configured to write, via the RFID system 255 a first data string to the each of the plurality of RFID tags 213 having the match. As described herein, the first data string may indicate that at least one of (a) the object 210 has been added to a transaction log 259, and (b) the barcode 212 associated with the object 210 has been decoded.

On the other hand, in some embodiments, for each of the plurality of RFID tags lacking the match between the object association and the at least one of (i) the object and (ii) the barcode associated with the object, POS controller 252 writes a second, alert string to the each of the plurality of RFID tags 213 lacking the match. This alert data string may indicate that the RFID tag 213 is not affixed to an object 210 that has been added to a transaction log 259. Additionally or alternatively, the POS controller 252 may cause the user interface 258 to perform at least one of adding and requesting to add an item associated with the each of the plurality of RFID tags lacking the match to the transaction log 259. Accordingly, if the user subsequently adds the requested item to the transaction log 259, the user may not need to scan the item using the optical scanner 254.

At block 410, the POS controller 252 conducts a detection operation wherein the detection operation attempts to detect, via the RFID system 255, at least one RFID tag 123 located within the at least the portion of the bagging area 52. Block 410 may involve similar actions described with respect to block 306 of the flow diagram 300.

At block 412, responsive to detecting a single RFID tag 213 having the first data string within the at least the portion of the bagging area 52, the POS controller 252 causes the user interface 258 to perform a first operation. In this scenario, the object 210 was properly scanned and bagged. Accordingly, the first operation may be to release of a hold.

At block 414, responsive to not detecting at least one RFID tag 213 having the data string within the at least the portion of the bagging area 52, the POS controller 252 causes the user interface 258 to perform a second operation. This scenario may be indicative of a user placing a different item in the bagging area 52 other than the object 210. Accordingly, the second operation may be to indicate that the user places the object 210 into the bagging area 52.

At block 416, responsive to detecting multiple RFID tags within the at least the portion of the bagging area 52, the POS controller 252 causes the user interface 258 to perform a third operation. This scenario may be indicative of a piggybacking or a foreign object scenario. Accordingly, the third operation may involve at least two sub-operations: the first sub-operation being performed responsive to each of the multiple RFID tags having the data string, and the second sub-operation being performed responsive to at least one of the multiple RFID tags lacking the data string. The first scenario may be indicative of the user placing multiple items of the same type into the bagging area 52 in response to a single optical scan. Accordingly, the first sub-operation may be to request at least one of (i) that an item be re-scanned and (ii) that a quantity of an object in the transaction log 259 be adjusted. The second scenario may be indicative of a user placing a different item into the bagging area 52. Accordingly, the second sub-operation may be to request at least one of (i) that an item be removed from the bagging area 52 and (ii) that an item be added to a transaction log 259.

In another scenario, the POS controller 252 detects at least one RFID tag 213 having the alert data string within the at least the portion of the bagging area 52. In this scenario, the POS controller 252 may be configured to generate an alert (e.g., causing an alert notification via the user interface 258 and/or notifying venue personnel to assist in the checkout process). It should be appreciated that the POS controller 252 generally performs only one of the first, second, and third operations in response to a particular detection operation.

Figure 7:
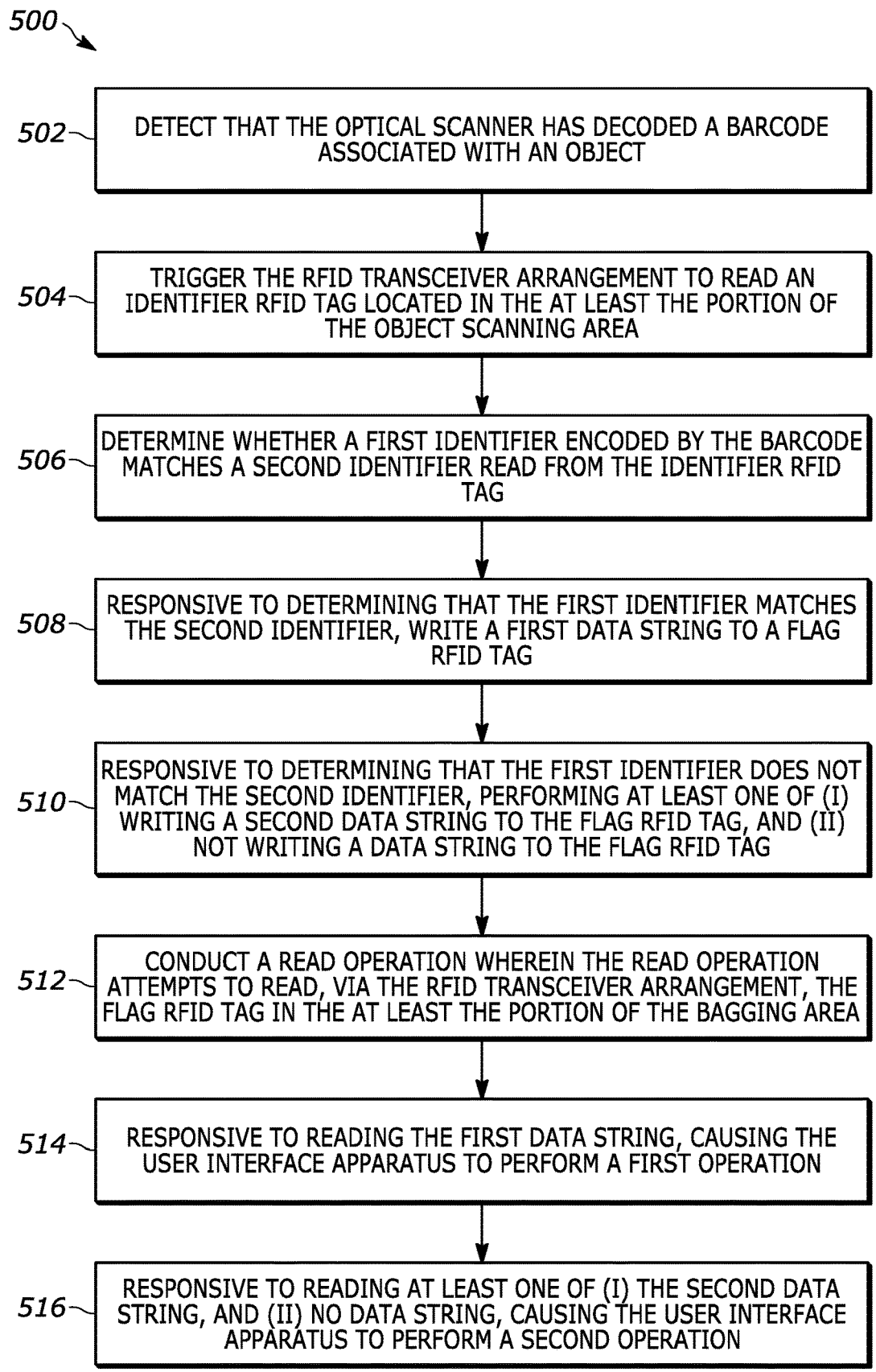

FIG. 7 illustrates an example flow diagram 500 that implements the point of sale RFID tracking techniques described herein. In an embodiment, the flow diagram 500 is implemented by the POS system 250 of FIG. 4. As described above, in an embodiment, the POS system 250 includes an optical scanner 254, a RFID system 255 that includes transceiver arrangements 251, 253 configured to have a signal range that extends (i) over at least a portion of the object scanning area, and (ii) over at least a portion of the bagging area, respectively, a user interface 258, and a POS controller 252. For the example flow diagram 500, in some scenarios the object 210 has two RFID tags affixed thereto: an OEM-affixed identifier RFID tag 213b and a venue-affixed flag RFID tag 213a. As described herein, unlike the flag RFID tag 213a, the POS system 250 is generally not permitted to write to the identifier RFID tag 213b. In embodiments where the object 210 has a single RFID tag 213 affixed thereto, the single RFID tag 213 may function as both the identifier RFID tag 213b and the flag RFID tag 213a.

The method 500 begins at block 502 when the POS controller 252 detects that the optical scanner 254 has decoded a barcode 212 associated with an object 210. In response to decoding the barcode 212, the POS controller 252 may add an indication of the object 210 to the transaction log 259. At block 504, the POS controller 252 triggers the RFID system 255 to trigger the RFID system 255 to read the identifier RFID tag 213b located in the at least the portion of the object scanning area 51. Triggering the RFID system 255 to sense (e.g., interrogate) the RFID tags 213 causes the RFID tags 213 to transmit a corresponding response. It should be appreciated that in some scenarios where the object 210 is affixed with two RFID tags 213, both the identifier RFID tag 213b and the flag RFID tag 213a respond to the interrogation. In these scenarios, the POS system 252 may correspond the two responses to avoid double-counting the object 210. In other scenarios, the POS controller 252 formats the interrogation to specifically target the identifier RFID tag 213b, for example, by using information about the object 210 determined from the identifier encoded by the barcode 212.

At block 506, the POS controller 252 determines whether the first identifier encoded by the barcode 212 matches a second identifier read from the identifier RFID tag 213b. At block 508, responsive to determining that the first identifier matches the second identifier, the POS controller 252 writes a first data string to the flag RFID tag 213a. On the other hand, at block 510, responsive to determining that the first identifier does not match the second identifier, the POS controller 252 performs at least one of (i) writing a second data string to the flag RFID tag 213a, and (ii) not writing a data string to the flag RFID tag 213a. Blocks 506-510 may generally involve similar actions described with respect to blocks 406-408 of the flow diagram 400. For scenarios where the POS controller 252 writes the first or second data string to the flag RFID tag 213, the POS controller 252 may either (i) transmit the write command to all RFID tags in the at least a portion of the object scanning area 51 expecting the identifier RFID tag 213b to return an error code if it is an OEM-affixed RFID tag or (ii) transmit the write command to specifically target the flag RFID tag 213a. In either case, the flag RFID tag 213a may respond to the write command with a write confirmation message. In response, the POS controller 252 may generate a user-interpretable successful-decode signal.

At block 512, the POS controller 252 conducts a read operation wherein the read operation attempts to read, via the RFID system 255, the flag RFID tag 213a in the at least the portion of the bagging area 52. At block 514, responsive to reading the first data string, POS controller 252 causes the user interface 258 to perform a first operation, for example, the release of a hold. At block 516, responsive to reading at least one of (i) the second data string, and (ii) no data string, the POS controller 252 causes the user interface 258 to perform a second operation. For example, the second operation may be at least one of (i) a notification requesting that a foreign object be removed from the bagging area, (ii) a notification requesting that the foreign object be scanned by the optical scanner, and (iii) an alert message transmitted to a venue personnel. Blocks 506-510 may generally involve similar actions described with respect to blocks 306-310 of the flow diagram 300.

Figure 8:
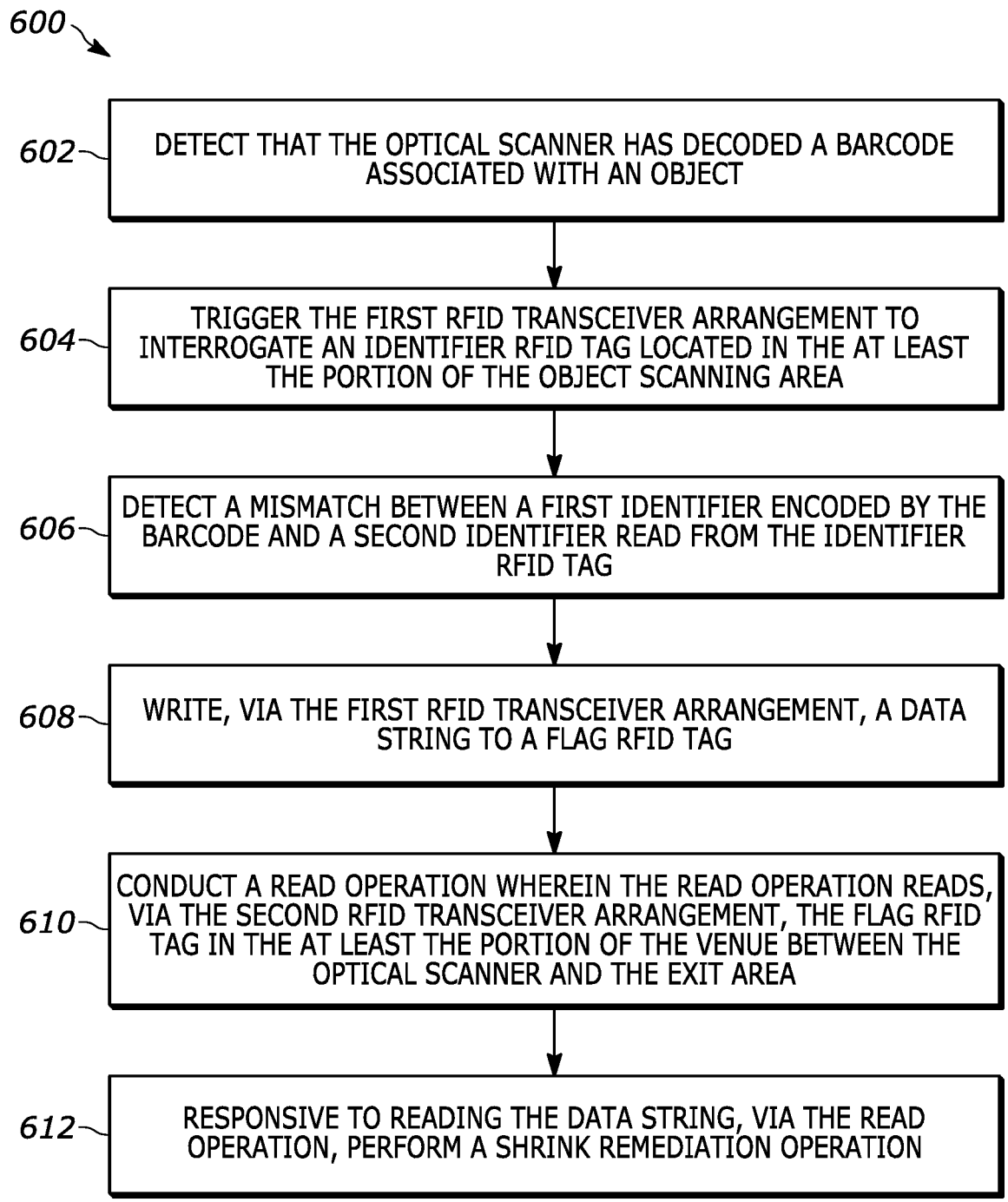

FIG. 8 illustrates an example flow diagram 600 that implements the RFID tracking techniques described herein. In an embodiment, the flow diagram 600 is implemented by both the POS system 250 and the central controller 216 of FIG. 4. As described above, in an embodiment, the POS system 250 includes an optical scanner 254, a RFID system 255 that includes transceiver arrangement 251 configured to have a signal range that extends over at least a portion of the object scanning area, a user interface 258, and a POS controller 252. For the example flow diagram 600, in some scenarios the object 210 has two RFID tags affixed thereto: an OEM-affixed identifier RFID tag 213b and a venue-affixed flag RFID tag 213a. As described herein, unlike the flag RFID tag 213a, the POS system 250 is generally not permitted to write to the identifier RFID tag 213b. In embodiments where the object 210 has a single RFID tag 213 affixed thereto, the single RFID tag 213 may function as both the identifier RFID tag 213b and the flag RFID tag 213a. Additionally, in some scenarios, the RFID system 255 of the POS system 250 does not have a signal range that extends over the bagging area 52 (or at least not optimized for signally communicating with RFID tags 213 disposed in the bagging area 52). Instead, the RFID tracking system includes a RFID reader 231 of the detector station 30' that is (i) operatively connected to the central controller 216 and (ii) configured to have a signal range that extends over at least a portion of the venue 100 between the optical scanner 254 and an exit area of the venue 100.

The method 600 begins at block 602 when the POS controller 252 detects that the optical scanner 254 has decoded a barcode 212 associated with an object 210. In response to decoding the barcode 212, the POS controller 252 may add an indication of the object 210 to the transaction log 259. At block 604, the POS controller 252 triggers the RFID system 255 to trigger the RFID system 255 to interrogate the identifier RFID tag 213b located in the at least the portion of the object scanning area 51. Triggering the RFID system 255 to interrogate the identifier RFID tag 213b causes the identifier RFID tag 213b to transmit a corresponding response. Blocks 602-604 may generally involve similar actions described with respect to blocks 502-504 of the flow diagram 500.

At block 606, the POS controller 252 detects a mismatch between a first identifier encoded by the barcode 212 and a second identifier read from the identifier RFID tag 213b. At block 608, the POS controller 252 writes, via the RFID system 255, a data string to the flag RFID tag 213a. Blocks 606-608 may generally involve similar actions described with respect to blocks 506 and 510 of the flow diagram 500, however, the string written at block 608 is the alert data string and not the data string that indicates the object 210 was added to the transaction log 259.

At block 610, the central controller 216 conducts a read operation via the RFID reader 231 of the detector station 30'. Accordingly, the central controller 216 is able to read the flag RFID tag 213a while the flag RFID tag 213a is located in the at least the portion of the venue 100 between the optical scanner 254 and the exit area. More particularly, the central controller 216 reads the alert data string from the flag RFID tag 213a. At block 612, responsive to reading the alert data string via the read operation, the central controller 216 performs a shrink remediation operation. For example, the shrink remediation operation may include at least one of (i) generating an alert, (ii) closing a door associated with the venue exit area, and (iii) notifying a communication device associated with venue security.

Figure 9:
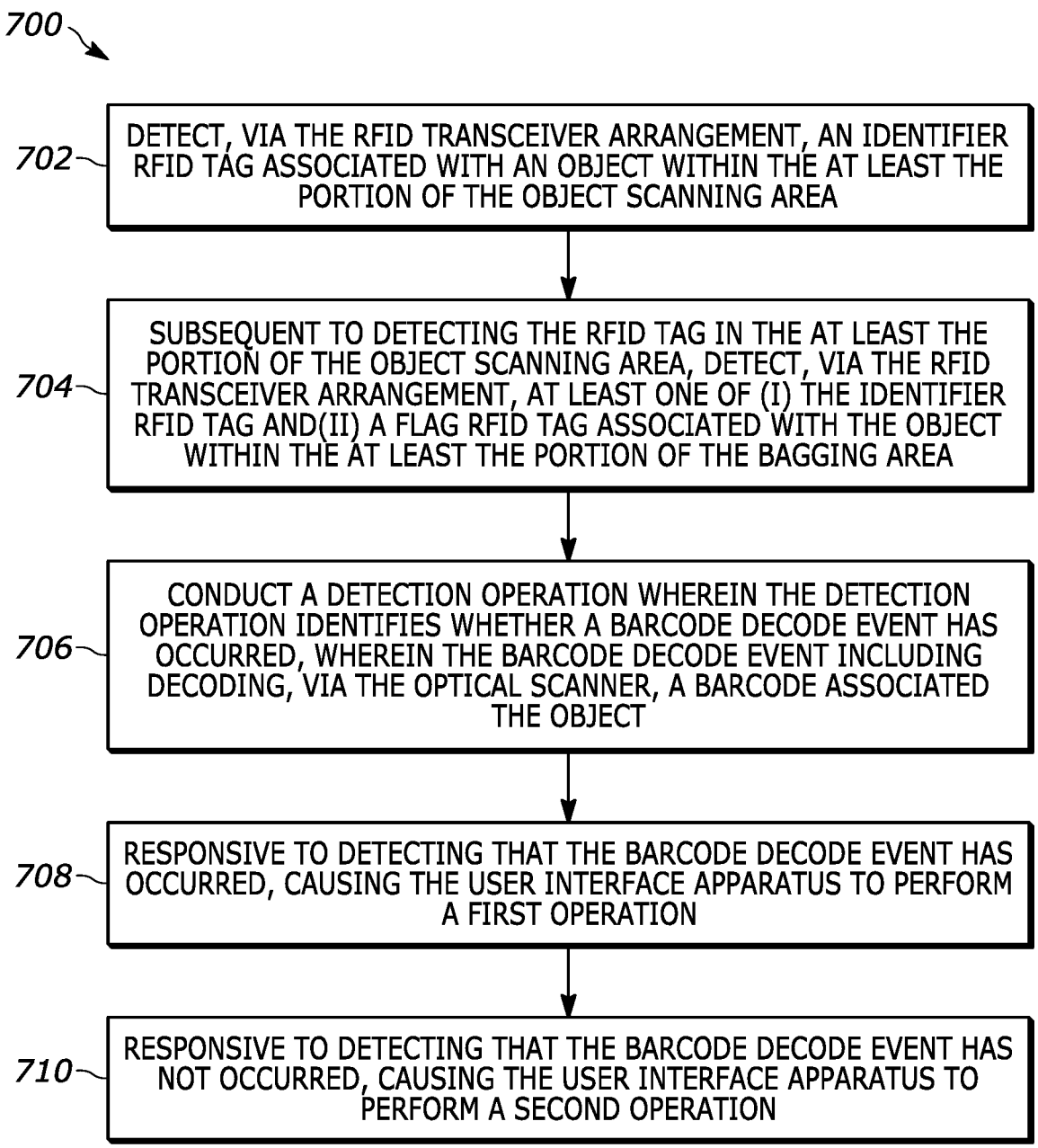

FIG. 9 illustrates an example flow diagram 700 that implements the point of sale RFID tracking techniques described herein. In an embodiment, the flow diagram 500 is implemented by the POS system 250 of FIG. 4. As described above, in an embodiment, the POS system 250 includes an optical scanner 254, a RFID system 255 that includes transceiver arrangements 251, 253 configured to have a signal range that extends (i) over at least a portion of the object scanning area, and (ii) over at least a portion of the bagging area, respectively, a user interface 258, and a POS controller 252. For the example flow diagram 700, the RFID system 255 may, in some embodiments, operate as an RFID reader without the inclusion of RFID writer components and/or configuration. As described herein, unlike the flag RFID tag 213a, the POS system 250 is generally not permitted to write to the identifier RFID tag 213b. In embodiments where the object 210 has a single RFID tag 213 affixed thereto, the single RFID tag 213 may function as both the identifier RFID tag 213b and the flag RFID tag 213a.

The method 700 begins at block 702 when the POS controller 252 detects, via the RFID system 255, the identifier RFID tag 213b associated with the object 210 within the at least the portion of the object scanning area 51. More particularly, the POS controller 252 detects the identifier RFID tag 213b via the scanning area transceivers 251.

At block 704, subsequent to detecting the identifier RFID tag in the at least the portion of the object scanning area, detect, via the RFID system 255, at least one of (i) the identifier RFID tag 213b and (ii) the flag RFID tag 213a associated with the object 210 within the at least the portion of the bagging area 52. More particularly, the POS controller 252 detects the identifier RFID tag 213b and/or flag RFID tag 213a via the bagging area transceivers 253.

At block 706, the POS controller 252 conducts a detection operation wherein the detection operation identifies whether a barcode decode event has occurred. The barcode decode event includes decoding, via the optical scanner 254, the barcode 212 associated the object 210. In some embodiments, the detection operation includes determining that the barcode decode event occurred within a predetermined amount of time before the flag RFID tag 213a and/or identifier RFID tag 213b was detected within the at least the portion of the bagging area 52. To this end, the POS controller 252 may determine that the product identifier obtained via the RFID system 255 matches an object added to the transaction log 259 within the predetermined amount of time (e.g., 5 seconds, 10 seconds, 30 seconds, and so on).

At block 708, responsive to detecting that the barcode decode event has occurred, the POS controller 252 causes the user interface 258 to perform a first operation, for example, releasing a hold. At bloc 710, responsive to detecting that the barcode decode event has not occurred, the POS controller 252 causes the user interface 258 to perform a second operation. For example, the second operation may include at least one of (i) a notification requesting that a foreign object be removed from the bagging area 52, (ii) a notification requesting that the foreign object be scanned by the optical scanner 254, and (iii) an alert message transmitted to a venue personnel. It should be appreciated that the POS controller 252 may also transmit the alert message to venue personnel without the user interface 258 performing an action.

While to foregoing description of the example method 700 relates to a POS system 250 where the RFID system 255 operates as just an RFID reader, alternate POS systems 250 that include RFID systems 255 that also operate as an RFID writer may be configured to perform the example method 700. In these embodiments, the responsive to detecting the identifier RFID tag 213*b* in the at least a portion of the object scanning area 51 and/or the bagging area 52, the POS controller 252 is configured to write a data string to a memory of the flag RFID tag 213*a*. This data string may indicate that the object 210 was added to transaction log 259 and/or has been properly bagged. In embodiments where the POS controller 252 writes the data string to the flag RFID tag 213*a* in response to detecting the identifier RFID tag 213*b* in the object scanning area 51, the POS controller 252 may read the data string from the memory of the flag RFID tag 213*a* as part of detecting the at least one of (i) the identifier RFID tag and (ii) a flag RFID tag in the bagging area 52. Accordingly, the detection operation may be performed by the POS controller 252 responsive to reading the data string from the memory of the flag RFID tag 213*a*.

In some additional embodiments, where the second operation includes writing an alert data string to the memory of the flag RFID tag 213*a*, the POS system 250 interfaces with the central controller 216 to detect the presence of the flag RFID tag 213*a* within at least a portion of the venue between the optical scanner 254 and an exit area via detector station 30'. Similar to blocks 610-612 of the example flow diagram 600, the central controller 216 may be configured to conduct a read operation to read, via the RFID reader 231 of the detector station 30', the flag RFID tag 213*a* in the at least the portion of the venue between the optical scanner and the exit area. Responsive to reading the alert data string via the read operation, the central controller 216 performs a shrink remediation operation. For example, the shrink remediation operation may include at least one of (i) generating an alert, (ii) closing a door associated with the venue exit area, and (iii) notifying a communication device associated with venue security.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A point-of-sale (POS) system having an object scanning area and a bagging area, the POS system comprising:
    an optical scanner configured to detect barcodes associated with objects;
    a radio frequency identification (RFID) transceiver arrangement configured to interrogate RFID tags, wherein the RFID transceiver arrangement is configured to have a signal range that extends (i) over at least a portion of the object scanning area, and (ii) over at least a portion of the bagging area;
    a user interface apparatus; and
    a controller operatively connected to the optical scanner, the RFID transceiver arrangement, and the user interface apparatus, wherein the controller is configured to:
        detect that the optical scanner has decoded a barcode associated with an object;
        trigger the RFID transceiver arrangement to write a data string to an RFID tag associated with the object and located within the at least the portion of the object scanning area;
        conduct a detection operation wherein the detection operation attempts to detect, via the RFID transceiver arrangement, the RFID tag with the data string in the at least the portion of the bagging area;
        responsive to detecting the RFID tag with the data string in the at least the portion of the bagging area, causing the user interface apparatus to perform a first operation; and
        responsive to not detecting the RFID tag with the data string in the at least the portion of the bagging area, causing the user interface apparatus to perform a second operation,
    wherein the first operation includes a release of a hold, the hold preventing at least one of (i) a subsequent decode of a subsequent barcode associated with a subsequent object, (ii) an addition of the subsequent object to a transaction log, or (iii) finalizing a transaction.

2. The POS system of claim 1, wherein the detection operation is conducted for a predetermined amount of time before the user interface apparatus is caused to perform the second operation.

3. The POS system of claim 1, wherein the controller is further configured to generate a user-interpretable successful-decode signal subsequent to receiving verification that the data string has been written to the RFID tag.

4. The POS system of claim 1, wherein the second operation includes a notification indicating that the object has not been detected in the at least the portion of the bagging area.

5. The POS system of claim 1, wherein the RFID transceiver arrangement includes:
    a first RFID antenna having a first signal range that extends over the at least the portion of the object scanning area; and
    a second RFID antenna separate from the first RFID antenna, the second RFID antenna having a second signal range that extends over the at least the portion of the bagging area.

6. The POS system of claim 5, wherein the first RFID antenna is disposed in at least one of (i) a substantially horizontal position, and (ii) a substantially vertical position within a housing that includes the optical scanner.

7. The POS system of claim 5, wherein the POS system includes a handheld scanner, and wherein the optical scanner and the first RFID antenna are disposed within a housing of the handheld scanner.

8. The POS system of claim 5, wherein the second RFID antenna is disposed in at least one of (i) a substantially horizontal position within a base unit of the bagging area, and (ii) a substantially vertical position within a structure extending above the base unit of the bagging area.

9. The POS system of claim 5, wherein the second RFID antenna is disposed in a housing affixed to a shopping cart.

10. The POS system of claim 1, wherein the RFID transceiver arrangement includes a phased antenna array.

11. The POS system of claim 10, wherein the controller is further configured to detect, via the phased antenna array, a movement of the object from the object scanning area to the bagging area.

12. The POS system of claim 1, wherein to conduct the detection operation, the controller is further configured to:
 read, via the RFID transceiver arrangement, from a memory of the RFID tag associated with the object; and
 determine that (i) the memory of RFID tag stores the data string, and (ii) the data string indicates that at least one of (a) the object has been added to a transaction log, and (b) the barcode associated with the object has been decoded.

13. The POS system of claim 1, wherein the controller is further configured to:
 read, via the RFID transceiver arrangement, from a memory of a secondary RFID tag located within the at least the portion of the bagging area;
 determine that the memory does not store the data string; and
 cause the user interface apparatus to perform a third operation.

14. The POS system of claim 13, wherein the third operation includes at least one of (i) a notification requesting that a foreign object be removed from the bagging area, and (ii) a notification requesting that the foreign object be scanned by the optical scanner.

\* \* \* \* \*